Patented Apr. 16, 1946

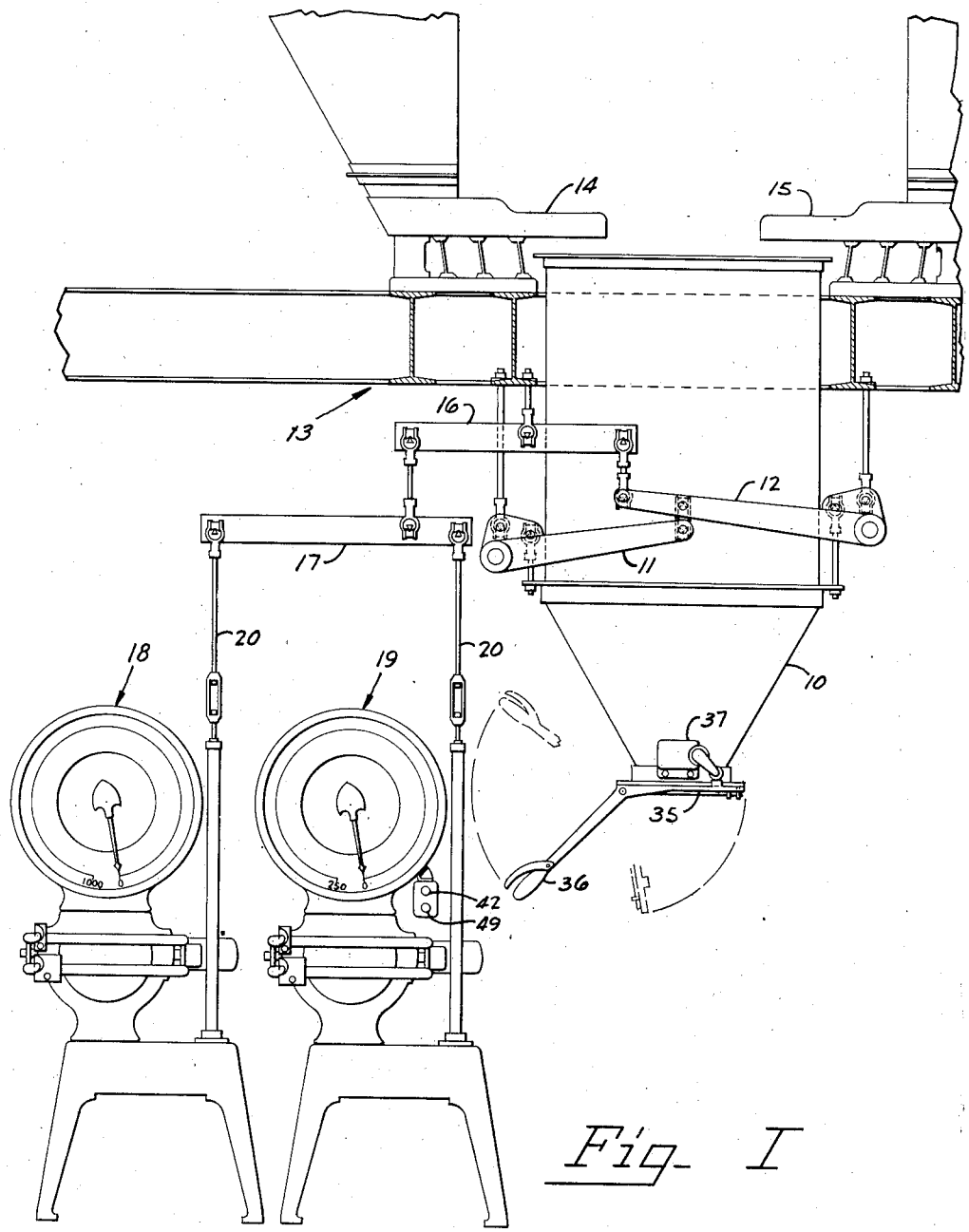
Fig. I

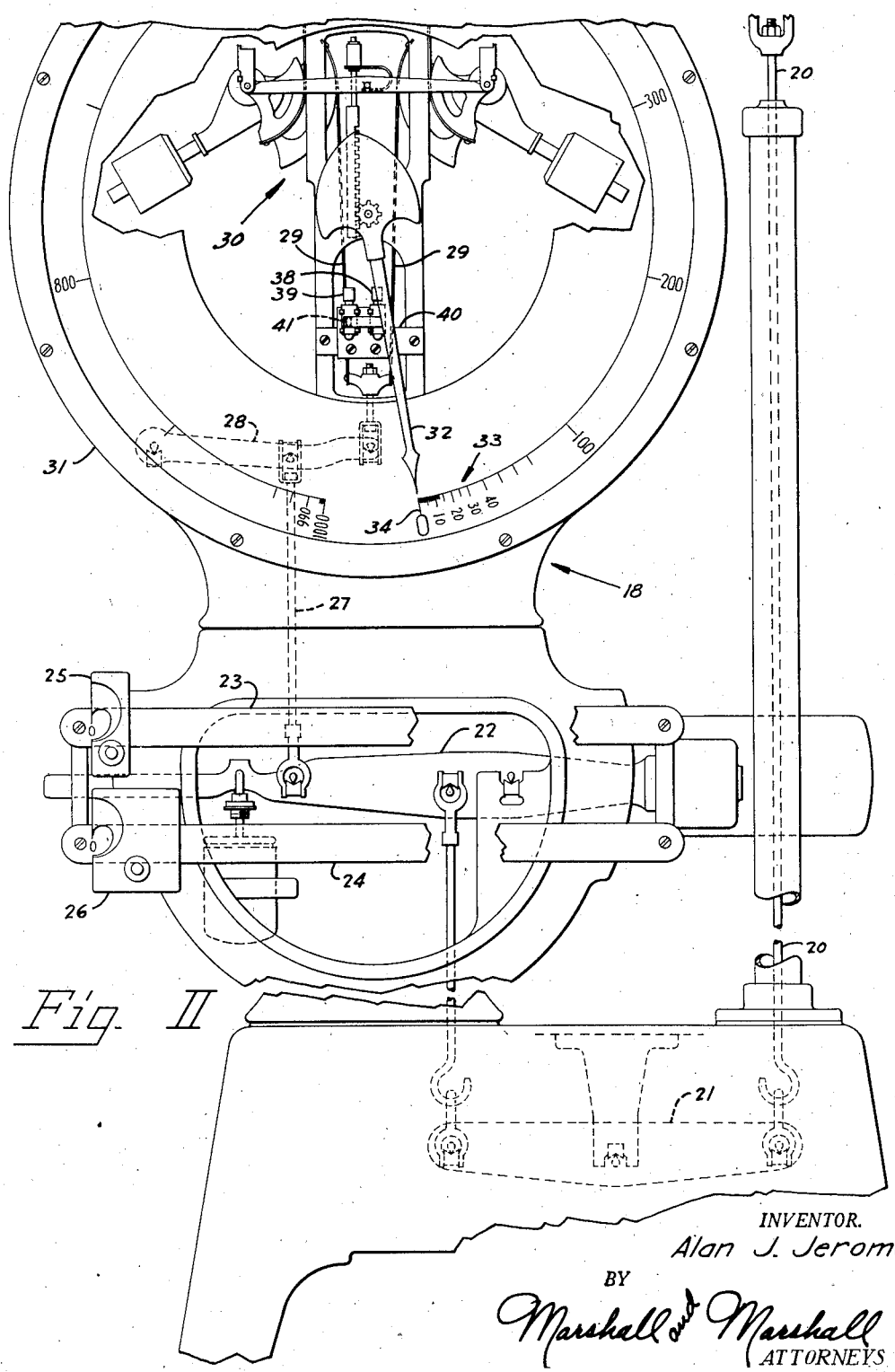

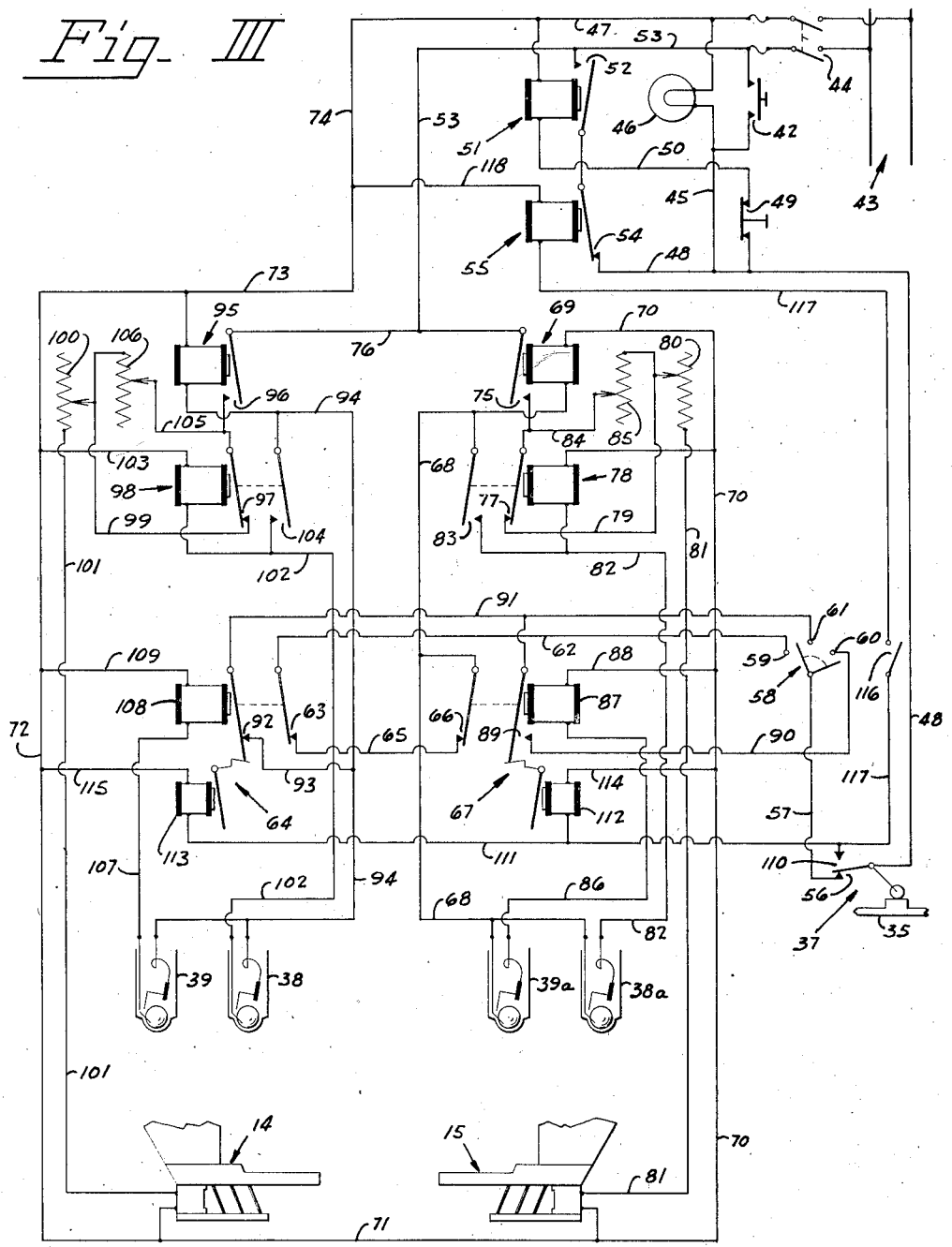

2,398,643

UNITED STATES PATENT OFFICE 2,398,643

BATCHING SCALE

Alan J. Jerome, Toledo, Ohio, assignor to Toledo Scale Company, Toledo, Ohio, a corporation of New Jersey Application December 24, 1942, Serial No. 470,050

8 Claims. (Cl. 249—14)

This invention relates to weighing scales for the preparation of batches comprising different ingredients in the weighing of which it is desired that the same percentage accuracy be observed and in which the quantity of one ingredient is usually several times as large as the quantity of another.

When batches are made up of two different ingredients and the weights of the two ingredients are substantially different, if a single weighing scale is used to weigh both of the ingredients the percentage of accuracy in the weighing of that ingredient which is used in smaller quantity is not as accurate as the other. This is due, of course, to the fact that a scale of sufficient capacity to weight the ingredient used in larger amounts is only accurate to a certain minimum quantity of material and when used to weigh a smaller amount this minimum quantity represents a larger percentage error.

It is an object of this invention to provide a batching scale for making up batches comprising two ingredients where one ingredient forms a much larger percentage of the batch than the other which will weigh each of the two ingredients with the same percentage of accuracy.

It is a further object of this invention to provide a batching scale for the mixture of batches made up of two different ingredients, which can be set automatically to weigh each of the ingredients into the mixing or batching hopper.

It is another object of this invention to provide a batching scale in which batching cycles can be controlled manually or can be instigated automatically by the discharge of a previously compounded batch.

It is a further object of this invention to provide an automatic repetitive cycle two ingredient batching scale which also can be used to weigh single charges of individual ingredients.

More specific objects and advantages are apparent from the description, in which reference is had to the accompanying drawings illustrating a preferred form of scale embodying the invention.

In the drawings:

Fig. I is a fragmentary view in elevation of a batching hopper equipped with batching scales embodying the invention.

Fig. II is a fragmentary view in elevation of the head of one of the scales illustrated in Fig. I.

Fig. III is a schematic wiring diagram of electrical apparatus for the control of the batching operations performed by the mechanism illustrated in Fig. I.

These specific drawings and the specific description that follows merely disclose and illustrate the invention and are not intended to impose limitations upon the claims.

A batching hopper 10 is supported upon main levers 11 and 12 from an overhead structure 13. A pair of automatic feeders 14 and 15 are mounted beneath the discharge ends of individual ingredient hoppers in position to feed the respective ingredients into the open upper end of the hopper 10. The two main levers 11 and 12 are linked together and connected to an extension lever 16, also suspended from the structure 13, which lever is in turn connected to a floating intermediate or ratio lever 17. The intermediate or ratio lever 17 divides the load force between a pair of force counterbalancing and indicating mechanisms or scales 18 and 19 and corresponds in function exactly to any intermediate lever used to reduce and transmit force between a load and a counterbalance. The connection to each of the scales 18 and 19 acts as a fulcrum in the transmission of force to the other. The arms of the lever 17 are shown as having lengths in the ratio of 4 to 1, the longer arm being connected to the scale 18. Thus the force is divided between the scales in the ratio of 4 to 1, the scale 18 carrying one fifth and the scale 19 carrying four fifths of the load force applied to the lever 17.

The reading of any scale is in terms of weight applied to the load receiver and is thus determined by the capacity of the counterbalance and the lever ratio between the counterbalance and the load receiver. The lever 17, in the example, has a ratio of 5 to 1 in transmitting force to the scale 18 and a ratio of 5 to 4 in transmitting force to the scale 19. Thus the weighing capacity of the scale 18 is four times that of the scale 19 and is calibrated accordingly. Because the force transmission ratio of the lever 17 is independent of the manner of supporting its fulcrum the operation of each of the scales 18 and 19 is entirely independent of the other. Thus either scale may be locked or even removed without altering the calibration or indication of the other. In the device illustrated in Fig. I the scale 18 is shown as having a maximum chart capacity of 1,000 pounds and the scale 19 as having a maximum chart capacity of 250 pounds. This is in a ratio of 4 to 1 and the two arms of the ratio lever 17 have the same ratio, the longer arm being connected to the scale of higher capacity, inasmuch as the force counterbalancing abilities of the two scale mechanisms are equal. The same result may be obtained with scale mechanisms of different force counterbalancing capacities provided the ratio lever 17 is correspondingly altered.

This device as illustrated is designed for the mixing of batches made up of two ingredients which are mixed in the batches in a ratio of approximately 3 to 1 by weight. The maximum weight of a mixed batch which can be weighed on the mechanism is 1,000 pounds, which would be made up of a maximum weight of 750 pounds of ingredient "B" and a maximum weight of 250 pounds of ingredient "A." If the weight ratio between the ingredients in the batch were different, i. e., 5 to 1 and the maximum weight of the smaller ingredient were 200 pounds, the maximum total weight of a mixed batch would be 1,200 pounds and, therefore, the scale 18 would have a maximum chart capacity of 1,200 pounds and the scale 19, a maximum chart capacity of 200 pounds. The ratio between the scale indicating capacities would be 6 to 1 and the ratio between arms of the lever 17 would also be 6 to 1 (if the scale mechanisms 18 and 19 have the same counterbalancing capacities).

Each end of the ratio lever 17 is connected to its respective scale by means of a steelyard rod 20 (see also Fig. II) which acts through a reversing lever 21 on a main lever 22 of the scale to which it is connected. (In Fig. II the scale 18 is illustrated.) The main lever 22 carries two beams 23 and 24 on which two poises 25 and 26, respectively, are slidable. The main lever 22 is connected through a pull rod 27 and a pendulum lever 28 to the lower ends of two metallic ribbons 29 and through the ribbons 29 to pendulum load counterbalancing mechanism 30. The load counterbalancing mechanism is located in the interior of a dial housing 31 and rotates an indicator 32 which in cooperation with a series of indicia 33 indicates the weights of loads counterbalanced by the mechanism 30. It should be noted in Fig. II that when the indicator 32 points to a zero indicium 34 in the series 33, the pendulums, which comprises a part of the load counterbalancing mechanism 30, are elevated. The weighing scale 19 is constructed similarly to the scale 18 with the exceptions that its total load indicating capacity, because of the ratio of the lever 17, is smaller and that a collar is firmly attached to the steelyard rod 20. The collar, by engaging the lower surface of the scale frame when the indicating capacity of the scale is reached, relieves the scale mechanism of overload as the load in the hopper is increased. The decreased indicating capacity of the scale 19 provides greater accuracy from the standpoint of quantity and equal accuracy from the standpoint of percentage as that obtained in the scale 18.

The scale is so constructed that when the poises 25 and 26 are moved to the right on the beams 23 and 24 the pendulums fall and the indicator 32 rotates in a counterclockwise direction. When the quantity of the material to be weighed by the scale 19 is determined the operator slides the poises to the right until the scale indicator points to this particular number of pounds. The operator then adds the number of pounds of this ingredient to the number of pounds of the ingredient to be weighed by the scale 18 and by sliding its poises 25 and 26 to the right causes its indicator 32 to rotate in a counterclockwise direction until it reaches a figure representing the sum of the weights, i. e., if the batch to be weighed should contain 200 pounds of the ingredient controlled by the scale 19, and 600 pounds of the ingredient controlled by the scale 18, the two scales would be set at 200 pounds and 800 pounds respectively.

A gate 35 on the lower end of hopper 10 is opened and closed by a handle 36 connected thereto and operating a limit switch 37 which is mounted on the hopper 10. A pair of magnetic switches 38 and 39 (Fig. II) are, in a manner illustrated in United States Patent Number 2,341,251, adjustably mounted upon a plate 40 located in the interior of the dial housing 31 and adjacent to the plane of rotation of the indicator 32. The switches 38 and 39 are both operated by a magnet 41 which is carried by the indicator 32. The switch 39 is positioned so that it will be operated by the magnet 41 when the indicator reaches zero, or in other words, when the "back weight" placed on the scale by the poises 25 and 26 has been overcome by material fed into the hopper 10. The switch 38 is so placed as to be operated a short time previously. Each of the scales 18 and 19 is so equipped with two magnetic switches, the first automatic switch 38 in the scale 18 operating to slow down the feed of the ingredient under control and the second switch (the switch 39 in the scale 18) operating to stop the flow of such ingredient.

The operation of the device (with reference to Fig. III) is as follows:

After a previous batch has been discharged and the hopper gate 35 is closed a normal operation comprising the weighing of one batch of two ingredients is started by the closing of a start switch 42 which permits current to flow from one side of a power line 43 through a main switch 44 and the start switch 42 to a lead 45 and through a pilot light 46 to a lead 47 and the opposite side of the line. Current also flows from the lead 45 to a lead 48 and through a stop switch 49 and a lead 50 to a relay 51 and thence to the lead 47. Energization of the solenoid 51 closes its normal open contact 52 and current is shunted around the switch 42 from one side of the line through a lead 53, the contact 52, a normally closed contact 54 of a relay 55 and the leads 48 and 45 through the pilot light 46 to the lead 47 and from the lead 48, through the stop switch 49 and lead 50 to the coil of the relay 51 and the opposite side of the line. This seals in the relay 51 and holds the circuit energized. Current also flows through the lead 48 to the hopper gate limit switch 37 and (the gate being closed) through its contact 56 to a lead 57 and then to the common connection of a three way selector switch 58. The selector switch 58 determines whether a cycle of weighing employing both scales and including the weighing of two ingredients is to be performed and also permits the operation of either one of the scales individually. Normally, the switch 58 is set with two contacts 59 and 60 closed and a third contact 61 open. After passing through the switch 58 and the contact 59 current flows through a lead 62 a normally closed contact 63 of a latching relay 64, a lead 65 a normally closed contact 66 of a latching relay 67 and a lead 68 to the coil of a relay 69 and then through a lead 70, a lead 71 and leads 72, 73 and 74 to the lead 47 and the opposite side of the line. Energization of the relay 69 closes its normally open contact 75 and current flows from the lead 53 through a lead 76, the contact 75, a normally closed contact 77 of a relay 78, a lead 79 to a speed control rheostat 80 and thence through a lead 81 to the motor of the feeder 15 and then to the leads 71, 72, etc., and the opposite side of the line.

The feeder 15 continues to operate, feeding material into the batching hopper 10 until the weight of the material approaches the weight at which the poises of the scale 19 have been set and the magnet mounted on its indicator actuates its slow feed switch 38—a to close the switch. Current then flows from the lead 68 through the switch 38—a and a lead 82 to the coil of the relay 78 and then to the leads 70 and 71 and the opposite side of the line. Energization of the relay 78 closes its normally open contact 83 which shunts the magnetic switch 38—a by connecting the coil of the relay directly to the lead 68. Energization of the relay 78 also opens its normally closed contact 77 and current which was flowing from the contact 75 of the relay 69 through the contact 77 to the rheostat 80 and the feeder 15 now flows from the contact 75 through a lead 84 and a second feed control rheostat 85, and the rheostat 80 and the lead 81 to the feeder motor. This causes the feeder operation to slow down which feeds the last remaining increment of material into the hopper very slowly.

When the weight of material "A" in the hopper reaches the amount for which the scale 19 has been conditioned its indicator reaches zero and the magnet carried thereby closes its cut-off switch 39—a. Current then flows from the lead 68 through the switch 39—a and a lead 86 to the latching coil 87 of the latching relay 67 and through a lead 88 to the leads 70, 71, etc., to the line. This energizes the coil 87 and breaks the normally closed contact 66 of the latching relay thus de-energizing the lead 68 and the relays 69 and 78 which are fed thereby to break the circuits energizing the motor of the feeder 15 and stop the flow of material fed thereby. Energizing of the coil 87 also closes its normally opened contact 89 and latches such contact closed.

Current can then flow from the lead 57 through the selector switch 58 and its contact 60 and a lead 90 to the contact 89 and a lead 91 to a normally closed contact 92 of the latching relay 64 and then through a lead 93 to a lead 94 and through the coil of a relay 95 to the lead 73 and the opposite side of the line. Energization of the relay 95 closes its normally opened contact 96 and current flows from the lead 53 through the lead 76, the contact 96, a normally closed contact 97 of a relay 98 and a lead 99 to a feed control rheostat 100 and thence through a lead 101 to the motor of the feeder 14 and the leads 71, 72, etc., to the opposite side of the line. Material "B" is fed into the hopper 10 until the indicator 32 of the scale 18 carries the magnet 41 into position to close the slow speed feeding switch 38. When this switch is closed current flows from the lead 94 through the switch 38 and a lead 102 to the coil of the relay 98 and through a lead 103 to the lead 72 and the opposite side of the line. Energization of the relay 98 closes its normally open contact 104 and shunts around the switch 38 connecting the lead 94 directly to the lead 102 and opens its normally closed contact 97. Current from the contact 96 no longer can flow across the contact 97 to the rheostat 100 but must flow from the contact 96 through a lead 105 to a second speed control rheostat 106 and then through the rheostat 100 to the lead 101, the motor of the feeder 14 and the leads 71, 72, etc., to the opposite side of the line. This slows the operation of the feeder 14 but material continues to "dribble" into the hopper 10 until the indicator returns to zero at which time its magnet closes the cut-off switch 39 and current flows from the lead 94 through the switch 39, a lead 107 and the latch closing solenoid 108 of the latching relay 64 and then through a lead 109 to leads 72, 73, etc., and the opposite side of the line. Energization of the latch closing solenoid 108 opens both contacts 63 and 92 of the latching relay 64 breaking the circuits which energize the lead 94 and the relays 95 and 98 controlling the operation of the feeder 14 and thus stopping the flow of material "B" into the batching hopper 10.

After the correct quantity of the second material has been weighed into the batching hopper the two materials are accumulated therein in their correct proportions. The gate 35 is then opened manually and the batch discharged into a conveyor or further processing machinery. When the gate 35 is opened its limit switch opens the contact 56 thus de-energizing the power leads 68 and 94. Opening of the gate 35 also causes its limit switch to close its contact 110, which permits current to flow from the lead 48 through the contact 110 and a lead 111 to two latch releasing solenoids 112 and 113 of the latching relays 67 and 64, respectively, and then through two leads 114 and 115 to the leads 70 and 72 and the opposite side of the line. Energization of the latch releasing solenoids unlatches the two relays 64 and 67 and permits their contacts to re-set for a subsequent cycle of operations.

When the hopper gate is closed again the limit switch contact 56 again is closed instituting a new cycle of operations and the resulting weighing of a second batch of material.

The mechanism may also be set to operate on a single cycle basis. Selection between automatic or single cycle operation is determined by the setting of a switch 116. When automatic repetitive operation is desired the switch is left open and the mechanism operates in the manner already disclosed. When single batch or single cycle operation is desired the switch 116 is closed and thus when the hopper gate 35 is opened to discharge a compounded batch and the contact 110 of the limit switch 37 is closed (unlatching the two relays as above disclosed) current also flows from the lead 48 through the contact 110 and a lead 117 to the coil of the relay 55 and then through a lead 118 to the lead 74 and the opposite side of the line. Energization of the coil of the relay 55 breaks its normally closed contact 54 thus breaking the shunt around the start switch 42 and the circuit which holds the relay 51 closed, and de-energizing the lead 48. Therefore, when the hopper gate is closed again the lead 48 is no longer connected to the line and a second cycle of operations does not ensue. In this event the next cycle of operations must be started by the momentary closure of the start switch 42.

The device also may be set to cause repetitive or single cycles of operation in which only one material is weighed, for example, if it is desired to make up batches of material "A" only. In this case the selector switch 58 is set so that only its contact 59 is closed. When the selector switch 58 is set in this manner the cycle of operations already described takes place until the desired quantity of material "A" has been fed into the hopper by the feeder 15 and the subsequent operation of the latching coil 87 which stops the operation of the feeder 15. When this occurs, since the contact 60 of the selector switch 58 is not closed, current does not flow through the lead 90 and the contact 89 to energize the leads 91 and 94 and the relay 95 permitting current to flow to the feeder 14, but instead the entire cycle of operations comes to a stop and, depending upon the setting of the switch 116, further operation is under the control of the hopper gate limit switch 37 (if the switch 116 is set at automatic) or under the control of the start switch 42 (if the switch 116 is set at single cycle operations).

Similarly the mechanism may be set to weigh batches of material "B" by positioning the selector switch 58 so that only its contact 61 is closed. When the selector switch is so positioned, since the contact 61 is connected to the lead 91, the lead 94 and coil of the relay 95 (which controls the operation of the feeder 14) are energized immediately upon the closing of gate 35 of the hopper and the contact 56 of the limit switch 37 and therefore the feeder 15 is never operated.

The operation of batching can be stopped at any time by opening the stop switch 49 which breaks the circuit sealing in the coil of the relay 51 and opens the contact 52 breaking the relay power circuit.

The batching mechanism herein disclosed selectively may be set to operate in any one of the following ways:

1. Automatic repetitive cycles.
   (a) Batches made up of two different materials compounded in selected weight ratios and both weighed with the same percentage of accuracy.
   (b) Batches made up of material "A" of any weight up to the maximum weighing capacity of the scale controlling this material.
   (c) Batches made up of material "B" of any weight up to the maximum capacity of the scale controlling this material.
2. Single cycles.
   (a) Batches of two different materials similar to 1 (a) above but with the compounding of each batch being individually controlled.
   (b) Single batches of material "A."
   (c) Single batches of material "B."

The embodiment of the invention that has been disclosed may be modified to meet various requirements.

Having described my invention, I claim:

1. In a scale for compounding batches made up of materials in different amounts, in combination, feeding means for each material, common material receiving means, a lever system supporting said material receiving means, a plurality of separate force counterbalancing and indicating mechanisms, said mechanisms being connected in parallel to said lever system such that each of said mechanisms continuously responds within its counterbalancing capacity to the weight of material in said receiving means, means for starting one of said feeding means for feeding material associated with the first of said mechanisms, and means operated by each of said mechanisms for stopping the feeding of the material under its control when a desired amount thereof has been fed into said material receiving means and for starting the operation of the next of said feeding means.

2. In a scale for compounding batches made up of two different materials in different amounts, in combination, feeding means for each material, common material receiving means, a lever system supporting said material receiving means, two separate force counterbalancing and indicating mechanisms, each of said mechanisms being connected to said lever system so that it acts as a fulcrum in the force transmitting system to the other of said mechanisms, each of said mechanisms being conditionable to counterbalance loads in said material receiving means and provided with an indicator to continuously indicate the deficiency of the weight from that weight for which the mechanism is conditioned, means for starting that one of said feeding means for feeding the material associated with the first one of said mechanisms, means operated by said first mechanism for stopping the feeding of said material when a desired amount thereof has been fed into said material receiving means and for starting the operation of the other of said feeding means and means controlled by the other of said mechanisms for stopping the operation of the other of said feeding means when a desired weight of the other of said materials has been fed into said material receiving means.

3. In a scale for compounding batches made up of two materials in different amounts, in combination, feeding means for each material, common material receiving means, a lever system supporting said material receiving means, a separate force counterbalancing and indicating mechanism corresponding to each of said materials, said mechanisms being connected in parallel to said lever system, means for conditioning each of said mechanisms to counterbalance a weight of material in said material receiving means and an indicator to indicate the deficiency of the weight in said material receiving means from that weight for which said mechanism is conditioned, means for starting that one of said feeding means for feeding that material associated with the first of said mechanisms, means operated by said first mechanism for stopping the feeding of said material when an amount equal to the weight for which the mechanism has been conditioned has been fed into said material receiving means and for starting the operation of the second of said feeding means and means controlled by the second of said mechanisms for stopping the operation of the second of said feeding means when a weight of material equal to the weight for which the second mechanism has been conditioned has accumulated in said material receiving means.

4. In a scale for compounding batches made up of two materials in different amounts, in combination, feeding means for each material, common material receiving means, a lever system supporting said material receiving means, a separate force counterbalancing and indicating mechanism corresponding to each of said materials, said mechanisms being connected in parallel to said lever system such that each of said mechanisms continuously responds to the weight of material in said receiving means as long as said weight is within the capacity of said mechanism, the capacity of the first of said mechanisms being slightly in excess of the maximum amount of one of the materials comprising a batch, the capacity of the other of said mechanisms being slightly in excess of the maximum weight of a batch, means for starting that one of said feeding means for feeding the material associated with the first one of said mechanisms, means operated by said first mechanism for stopping the feeding of said material when a desired amount thereof has been fed into said material receiving means and for starting the operation of the other of said feeding means, means controlled by the other of said mechanisms for stopping the operation of the other of said feeding means when a desired weight of the other of said materials has been fed into said material receiving means and means for emptying said materials from said material receiving means and for instigating a successive cycle of operations when said material feeding means has been emptied.

5. In a scale for compounding batches made up of two materials in different amounts, in combination, feeding means for each material, common material receiving means, a lever system supporting said material receiving means, a separate force counterbalancing and indicating mechanism corresponding to each of said materials, said mechanisms being connected in parallel to said lever system so that each of said mechanisms continuously indicates changes in the weight of material in said receiving means while such weight is within its weighing capacity, the maximum weight indicating capacity of one of said mechanisms being slightly in excess of the maximum weight of its associated material in a batch, the maximum weight indicating capacity of the other of said mechanisms being slightly in excess of the maximum weight of a batch, electrical apparatus including switches controlled by said force counterbalancing and indicating mechanisms, means for pre-setting each of said force counterbalancing mechanisms to operate that one of said switches under its control when a selected weight of its associated material has been fed into said material receiving means, each of said switches operating to cut off the feeding of the associated material, and a manually operated switch for starting the feeding of the first of said materials, that one of said switches controlled by the first of said mechanisms also operating to start the feeding of the other of said materials.

6. In a scale for compounding batches made up of two materials in different amounts, in combination, feeding means for each material, common material receiving means, a lever system supporting said material receiving means, a separate force counterbalancing and indicating mechanism corresponding to each of said materials, said mechanisms being connected in parallel to said lever system so that each of said mechanisms can independently indicate changes in the weight of the material in said receiving means, one of said mechanisms having weighing capacity to indicate the weight of the first material deposited in said receiving means, the other having weighing capacity to indicate the weight of both materials deposited as the second material is added, electrical apparatus including switches controlled by said force counterbalancing and indicating mechanisms, means for pre-setting each of said force counterbalancing mechanisms to operate that one of said switches under its control when a selected weight of its associated material has been fed into said material receiving means, each of said switches operating to cut off the feeding of the associated material, a manually operated switch for starting the feeding of the first of said materials, that one of said switches controlled by the first of said mechanisms also operating to start the feeding of the other of said materials and other electrical apparatus for rendering the last mentioned switch inoperative.

7. In a scale for compounding batches made up of various materials, in combination, feeding means for each material, common material receiving means, a lever system supporting said material receiving means, a plurality of force counterbalancing and indicating mechanisms, said mechanisms being connected to said lever system such that each serves as a fulcrum support in said lever system and by weighing the force exerted at such fulcrum independently responds to loads in said receiving means, means for starting the operation of the first of said feeding means, and means actuated by each of said mechanisms for stopping the feeder associated therewith and starting the next of said feeders.

8. In a scale for compounding batches made up of various materials, in combination, feeding means for each material, common material receiving means, a lever system supporting said material receiving means, a plurality of force counterbalancing and indicating mechanisms, said mechanisms being connected in parallel to said lever system such that each serves as a fulcrum support in transmitting force to the remaining of said mechanisms and such that the force transmission ratio between said receiving means and said mechanisms varies from mechanism to mechanism, means for initiating operation of one of said feeding means, means actuated by each of said mechanisms for stopping the associated feeder and starting the next of said feeders and means for selectively omitting the operation of a feeder from the cycle of operation.

ALAN J. JEROME.